(12) United States Patent
Steinwandel et al.

(10) Patent No.: US 9,541,001 B2
(45) Date of Patent: Jan. 10, 2017

(54) DRIVE UNIT, METHOD FOR PROVIDING POWER, AND USE OF A DRIVE UNIT

(71) Applicant: Airbus Operations GmbH, Hamburg (DE)

(72) Inventors: Jürgen Steinwandel, Uhldingen-Mühlhofen (DE); Christian Wolff, Ottobrunn (DE); Claus Hoffjann, Hamburg (DE)

(73) Assignee: Airbus Operations GmbH (DE)

( * ) Notice: Subject to any disclaimer, the term of this patent is extended or adjusted under 35 U.S.C. 154(b) by 538 days.

(21) Appl. No.: 14/058,943

(22) Filed: Oct. 21, 2013

(65) Prior Publication Data

US 2014/0047814 A1   Feb. 20, 2014

Related U.S. Application Data

(63) Continuation of application No. PCT/EP2012/057234, filed on Apr. 20, 2012.

(Continued)

(30) Foreign Application Priority Data

Apr. 21, 2011  (DE) .......................... 10 2011 018 448

(51) Int. Cl.
   *F02C 6/00*   (2006.01)
   *H01M 8/04*   (2016.01)
   (Continued)

(52) U.S. Cl.
   CPC ............ *F02C 6/00* (2013.01); *H01M 8/04022* (2013.01); *H01M 8/04111* (2013.01);
   (Continued)

(58) Field of Classification Search
   CPC ........ F02C 6/00; H01M 8/243; H01M 8/0631;
   H01M 8/04022; H01M 8/0411; H01M 8/1293; H01M 2250/40; H01M 2250/20; Y02E 60/521; Y02E 60/252; Y02E 60/50; Y02E 60/32
   See application file for complete search history.

(56) References Cited

U.S. PATENT DOCUMENTS 5,431,967 A   7/1995  Manthiram et al.
5,678,647 A * 10/1997  Wolfe ................. B60L 11/1881
                                                          429/430

(Continued)

FOREIGN PATENT DOCUMENTS

CN     1162368 A    10/1997
CN     1423034 A    6/2003
(Continued)

OTHER PUBLICATIONS

Chinese Office Action dated May 21, 2015.
Chinese Office Action dated Apr. 29, 2015.

*Primary Examiner* — Carlos A Rivera
(74) *Attorney, Agent, or Firm* — Lerner, David, Littenberg, Krumholz & Mentlik, LLP (57) ABSTRACT

A drive unit includes a combustion chamber for combusting a fuel/air mixture, and a fuel cell device, wherein the fuel cell device includes at least one fuel cell, which in each case includes an anode that is couplable to a fuel line, a cathode that is couplable to an air source, and a fluid outlet and is arranged upstream of the combustion chamber. The combustion chamber further includes a combustion chamber inlet for supplying the fuel/air mixture, and a combustion chamber outlet for discharging exhaust gas, and the combustion chamber inlet is connected to the fluid outlet of the fuel cell device. In this way a hybrid drive unit can be provided which apart from mechanical power also generates electrical power at high efficiency.

14 Claims, 5 Drawing Sheets

Related U.S. Application Data (60) Provisional application No. 61/477,703, filed on Apr. 21, 2011.

(51) Int. Cl.
*H01M 8/06* (2016.01)
*H01M 8/24* (2016.01)
*H01M 8/12* (2016.01)

(52) U.S. Cl.
CPC ......... *H01M 8/0631* (2013.01); *H01M 8/243* (2013.01); *H01M 2008/1293* (2013.01); *H01M 2250/20* (2013.01); *H01M 2250/40* (2013.01); *Y02E 60/50* (2013.01); *Y02E 60/521* (2013.01); *Y02E 60/525* (2013.01); *Y02E 60/56* (2013.01); *Y02T 90/32* (2013.01)

(56) References Cited

U.S. PATENT DOCUMENTS

| | | | |
|---|---|---|---|
| 5,693,201 A | 12/1997 | Hsu et al. | |
| 6,060,188 A * | 5/2000 | Muthuswamy | H01M 8/1002 429/419 |
| 6,492,050 B1 | 12/2002 | Sammes | |
| 6,669,463 B2 * | 12/2003 | Beutel | C01B 3/323 431/11 |
| 7,125,619 B2 * | 10/2006 | Tsunoda | H01M 8/0247 429/456 |
| 7,150,143 B2 * | 12/2006 | Schick | F02C 3/20 60/39.12 |
| 7,153,599 B2 | 12/2006 | Bunker et al. | |
| 7,166,380 B2 * | 1/2007 | Tsunoda | F01D 15/10 429/434 |
| 7,966,830 B2 * | 6/2011 | Daggett | B64D 27/02 60/780 |
| 8,282,989 B2 | 10/2012 | Coulon et al. | |
| 2003/0134169 A1 | 7/2003 | Sarkar et al. | |
| 2003/0134239 A1 * | 7/2003 | Beutel | C01B 3/323 431/7 |
| 2003/0235738 A1 | 12/2003 | Zheng | |
| 2004/0028986 A1 * | 2/2004 | Tsunoda | H01M 8/0247 429/456 |
| 2004/0040312 A1 | 3/2004 | Hoffjann et al. | |
| 2005/0019620 A1 * | 1/2005 | Schick | F02C 3/20 60/39.182 |
| 2006/0029849 A1 | 2/2006 | Metzler | |
| 2006/0222919 A1 * | 10/2006 | Tanaka | F02C 6/00 429/414 |
| 2006/0280979 A1 * | 12/2006 | Tsunoda | F01D 15/10 429/434 |
| 2007/0243444 A1 | 10/2007 | Zheng et al. | |
| 2008/0008826 A1 | 1/2008 | Coulon et al. | |
| 2010/0261074 A1 * | 10/2010 | Edlund | B01J 12/007 429/416 |
| 2011/0065019 A1 | 3/2011 | Taniguchi | |

FOREIGN PATENT DOCUMENTS

| | | |
|---|---|---|
| CN | 1514507 A | 7/2004 |
| CN | 1729589 A | 2/2006 |
| CN | 101088190 A | 12/2007 |
| DE | 10 216 710 A1 | 4/2003 |
| DE | 102 49 588 A1 | 5/2004 |
| DE | 10 2004 034 870 B4 | 8/2007 |
| DE | 10 2011 018 448 A1 | 10/2012 |
| GB | 2 469 043 A | 10/2010 |
| JP | 04-055364 A | 2/1992 |
| JP | 2-798281 B2 | 9/1998 |
| JP | 4055364 B2 | 3/2008 |
| WO | 96/05625 A2 | 2/1996 |
| WO | 99/19161 A1 | 4/1999 |
| WO | 2004004039 A1 | 1/2004 |

\* cited by examiner

DRIVE UNIT, METHOD FOR PROVIDING POWER, AND USE OF A DRIVE UNIT

CROSS-REFERENCE TO RELATED APPLICATIONS

The present application is a continuation of International Patent Application PCT/EP2012/057234, filed Apr. 20, 2012, which claims priority from German Patent Application No. 10 2011 018 448.1 filed Apr. 21, 2011 and which claims the benefit of the filing date of U.S. Provisional Patent Application No. 61/477,703 filed Apr. 21, 2011, the disclosures of which are hereby incorporated herein by reference.

TECHNICAL FIELD

The invention relates to a drive unit, to a method for providing power, and to the use of a drive unit in a vehicle.

BACKGROUND TO THE INVENTION

One of the most important present-day endeavors when designing drive units for various purposes relates to minimization of fuel consumption so as to achieve the most effective and environmentally-friendly operation of the drive unit. Depending on the respective purpose, weight reduction might also be paramount, for example in the case of drive units in vehicles. At present, for the purpose of optimization of fuel consumption in aircraft, the use of fuel cell systems is known in order to provide electrical power and in this way to partly reduce the mechanical power to be provided by main engines, some of which mechanical power is used to drive electrical generators. In order to simplify the provision of fuel for simultaneous operation of engines on the one hand, and fuel cells on the other hand, catalytic reformers are frequently used that from a hydrocarbon-based fuel provide a suitable fuel cell fuel so that in the vehicle concerned only a single type of fuel needs to be provided.

Parallel operation of engines and fuel cells that primarily provide mechanical power, in which engines and fuel cells there is either complete separation in spatial and functional terms or coupling takes place only by way of operating media in the form of fuel and air and/or from a thermal point of view by means of heat exchangers, could be further improved in order to exploit maximum possible efficiency.

BRIEF SUMMARY OF THE INVENTION

An aspect of the invention proposes a drive unit and a method for operating a drive unit in which unit and method a combustion engine and a fuel cell are in an integrative manner coupled to each other, wherein the fuel consumption of the drive unit is as low as possible while the overall efficiency is to be as high as possible.

The drive unit according to an embodiment of the invention comprises a combustion chamber for combusting a fuel/air mixture, wherein the combustion chamber comprises: a combustion chamber inlet for supplying the fuel/air mixture, and a combustion chamber outlet for discharging exhaust gas; at least one fuel cell device that comprises at least one fuel cell with an anode that can be coupled to a supply line for anode fuel, and with a cathode that can be coupled to an air source, wherein the fuel cell comprises a fluid outlet which is connected to the combustion chamber inlet. The combustion chamber is thus, in a direction of flow that is determined by the flow of the operating media, arranged downstream of the at least one fuel cell so that cathode/anode gas mixture that emanates from the at least one fuel cell can flow through said combustion chamber.

Accordingly, a core of the drive unit according to an embodiment of the invention consists of the particularly advantageous direct and highly-compact integration and coupling of a fuel cell device in/with a combustion chamber directly within a combustion engine, in which an airflow that is necessary for the function of the combustion engine flows from an air source under fluidic connection with the cathode into the fuel cell device and through said fuel cell device. In relation to the fuel cell process this airflow is thus hereinafter also referred to as the "cathode airflow", which results in the generation of electrical power by means of fuel supplied at the anode.

There is a special feature in that after partial removal of oxygen from the cathode airflow and after partial oxidation of fuel at the anode for operating the fuel cell the remaining cathode airflow and the remaining fuel mass flow leave the fuel cell device by way of the fuel cell outlet and directly reach the combustion chamber inlet of the combustion chamber. In that location the remaining (gaseous) fuel is combusted, preferably completely, and from the combustion chamber outlet is conveyed to the outside in the form of exhaust gas.

Consequently, the heat that has been generated within the fuel cell device during generation of electrical power, and the pressure that has increased as a result of oxidation, without heat exchangers or lines to bridge spatial distances, are fed directly to the combustion chamber. As a result of the combustion in the combustion chamber, the non-spent components of the fuel result in a further increase in pressure and in additional heating in said combustion chamber. The overall pressure attained within the combustion chamber is subsequently ready for the provision of mechanical power, which in commonly used drive units is present either in the form of rotary mechanical power or in the form of thrust. It is understood that in order to obtain particularly efficient operation combustion should be achieved which overall is stoichiometric, which can be achieved by regulating the supply of fuel to the at least one fuel cell.

The design of the fuel cells used should take place with the aim of achieving the lowest possible flow resistance so that the pressure differential achieved over the fuel cells is as low as possible. In an advantageous embodiment, for the purpose of increasing the fuel mass flow, a bypass can be provided that bypasses the fuel cells.

For the usual use of a liquid fuel, in an advantageous embodiment the drive unit comprises at least one fuel converter that is arranged between the fuel line and the fuel cell device and that is designed to convert a liquid fuel to a gaseous fuel and from it to generate hydrogen for operating the fuel cell. At this point the design both of the liquid fuel and of the gaseous fuel is not limited. The liquid fuel could, for example, be implemented in the form of hydrocarbon, e.g. BTL ("Biomass To Liquid") or GTL ("Gas To Liquid") fuel, or in the form of alcohol, for example methanol. The fuel converter comprises a vaporizer device, e.g. a heater, and a reactor, also referred to as a "reformer". In the reactor, hydrogen is generated from the gaseous fuel, in other words gas that contains hydrogen is generated, which gas apart from hydrogen also comprises non-combusted fuel and so-called residual fuel. The residual fuel arises from the fuel during generation of hydrogen; it arises, for example, as dehydrated fuel or as partially oxidized fuel, in other words fuel that has only been incompletely converted with oxygen.

For generating the hydrogen-containing gas in the reactor by reforming, various methods can be used. For example, the reactor can be designed to carry out catalytic partial oxidation or catalytic partial dehydration. The hydrogen generated in the reactor normally, before it can be supplied to the fuel cell, needs to be separated from the non-transformed fuel and from the residual fuel. Separation of the hydrogen gas can take place, for example, by means of a hydrogen-permeable membrane that is preferably located in the interior of the reactor.

Generally speaking, it should be noted that the use of a fuel which is liquid at the normal ambient temperature, depending on the application of the drive unit according to the invention, simplifies storage of said fuel. This suggests itself in particular in the use of the drive unit according to an embodiment of the invention in a vehicle.

Moreover, in this context the term "vehicle" refers to any imaginable type of vehicle, including earth-bound vehicles, aircraft, watercraft and spacecraft. However, the drive unit according to an embodiment of the invention is particularly suitable for use in aircraft and helicopters.

In an advantageous embodiment of the invention, the fuel cell device comprises a ring-shaped design, which in particular facilitates its use in tubular fuel cells or in fuel cells that are arranged in a ring-shaped manner in a rotationally-symmetrical drive unit.

In an advantageous embodiment of the invention, the drive unit comprises at least one compressor unit arranged upstream of the fuel cell device, and a turbine unit arranged downstream of the combustion chamber. The compressor unit comprises at least one compressor wheel, while the turbine unit comprises at least one turbine wheel. The at least one compressor wheel and the at least one turbine wheel are interconnected by way of at least one shaft. The drive unit, which represents a combination comprising a fuel cell and a combustion engine, according to an embodiment of the invention is thus designed specifically as a gas turbine which essentially between the compressor unit and the turbine unit comprises a fuel cell device through which air and fuel reach the combustion chamber and during flow-through are used to generate electrical power. In this arrangement the air source necessary for the fuel cell device and for the combustion chamber has been implemented by a compressor unit, usually a multi-stage compressor unit, arranged upstream, which results in adequate pressure being present to allow operation of the fuel cell device and to convey an adequately high fraction of a cathode airstream to the combustion chamber.

In an advantageous embodiment the fuel cell device is used as a multitude of fuel cells arranged parallel and/or sequentially one behind the other, which fuel cells are designed as tubular fuel cells that are open on two sides. In the dimensioning of the internal diameter and the external diameter of these tubular fuel cells, the ratio of the design space used to the surface available for the fuel cell process can be influenced, wherein the tubular shape at the same time ensures that an adequate through-flow of the cathode airstream and of the fuel is achieved.

Such fuel cells are preferably designed as solid-oxide fuel cells (SOFC) which as a rule are operated as high-temperature fuel cells with a temperature exceeding 600° C. The electrolyte of such a tubular fuel cell preferably comprises a ceramic material that is conductive to oxygen ions while having an insulating effect on electrons. Doped zirconium dioxide, for example doped with yttrium, might be a suitable material. The cathode of such a fuel cell is also preferably made from a ceramic material, which is conductive both to ions and to electrons, for example doped lanthanum manganate, with such doping taking place with the use of strontium or the like. An anode of this fuel cell could be made from a ceramic material that can comprise metallic components, for example a compound comprising nickel-doped and yttrium-doped zirconium oxide, in order to conduct ions and electrons. With the use of tubular fuel cells a multitude of self-contained fuel cells can be arranged in a ring-shaped manner around a connecting shaft between a turbine unit and a compressor unit so that particularly high electrical power can be provided with integration that is as compact as possible, and at the same time the through-flow of the combustion gas and the cathode air to the combustion chamber is simplified.

The design of the tubular fuel cells can comprise circular, elliptical, rectangular, polygonal or other regularly-shaped or irregularly-shaped cross sections, to which shapes the subject of the invention is not limited. This also relates to the course of a cross section along the length of a tubular fuel cell, which course is either constant, resulting for example in a cylindrical shape of the ceramic tube, or is not constant, resulting in a conical shape. Furthermore, the tubular fuel cells can also be designed with or without a collar on one side, which collar is directed upstream, by means of which collar the tubular fuel cells can be held in a particularly simple manner in receiving openings.

In an advantageous embodiment of the invention, the at least one tubular fuel cell comprises an anode formed by an inner surface, and a cathode formed by an outer surface. The design of the tubular fuel cell is thus particularly simple and robust, and conducting the electrical power provided can be implemented by a mechanical mount of the tubular fuel cells concerned.

As an alternative to this, each tubular fuel cell comprises a separate first electrode, which is connected to the outside of the fuel cell, and a separate second electrode, which is connected to the inside of the fuel cell. In this way, conduction of the electrical power to an electrical distributor unit is carried out.

In an advantageous embodiment of the invention, several tubular fuel cells are distributed in a ring-shaped manner around the at least one shaft between the turbine device and the compressor device. In this way the fuel cell device only uses quite a compact design space, and the gases emanating from the fuel cell device comprise flow characteristics that are suitable for ensuring a seamless transition for entry into a combustion chamber that is usually designed so as to be ring-shaped.

If tubular fuel cells are used, it is particularly advantageous if the anode fuel, i.e. the combustion gas, is fed through the inside of the fuel cells, wherein the cathode airflow is supplied by way of the outside of the tubular fuel cells. If the drive unit according to the invention is designed as a gas turbine, the airflow emanating from the compressor unit can simply flow around the cathodes of the tubular fuel cells so that as a result of this no separate supply line for the cathode gas is required.

In an advantageous embodiment of the invention, the fuel cell device comprises several tubular fuel cells which, on several concentrically arranged rings and/or on rings arranged one behind the other, are distributed relative to the at least one shaft. This can further increase the electrical power that can be provided.

In an advantageous embodiment of the invention, the at least one fuel converter is also ring-shaped and can thus simply comprise a shape that corresponds to that of the ring-shaped fuel cell device. Furthermore, deflection devices or other pipes for supplying the fuel from the fuel converter to a respective anode of the fuel cell device are unnecessary. In order to increase the capacity it is also possible to arrange several fuel converters concentrically and/or one behind the other, depending on the design of the fuel cell device arranged downstream.

By subjecting the fuel converter to warm compressed air from the upstream compressor unit, provided that normal pressure ratios are achieved, as is the case in standard gas turbines for vehicles and stationary operation, effective vaporization and/or catalytic conversion of the fuel can continue to be achieved, which makes it unnecessary to provide an external heat source. In this arrangement, a ring-shaped impact area for the compressed air emanating from the compressor device has a particularly advantageous effect on the efficiency of the introduction of heat for vaporization or catalytic conversion.

In an advantageous embodiment of the invention, the fuel converter comprises a ring-shaped design and establishes surface contact with the outsides and thus the cathodes of tubular fuel cells, which are arranged in a ring-shaped manner, to establish an electrical connection, thus forming the first electrode.

If the tubular fuel cells comprise a circumferential collar on an upstream-pointing end, said fuel cells can be inserted in a supporting aperture and can be retained by the fuel converter that is arranged upstream. As a result of the combination of the fuel converter and the first electrode, a separate component, designed as a first electrode, for each fuel cell can be saved because, taking into account the temperatures encountered during operation of the compressor unit, the fuel converter itself is preferably made from a metallic material and can consequently easily carry out this task and for conduction can be connected to a distributor unit for electrical power.

In an advantageous embodiment of the invention, a second electrode for each individual fuel cell is designed as a mount, situated within the respective fuel cell, comprising a metallic material, which mount can be connected to a distributor unit for electrical power, thus obviating the need for using a separate component for retention and for the electrical connection to the anode.

In an advantageous embodiment of the invention, the second electrode is designed as a mount that is held in an insulated manner within a ring-shaped fuel converter. In this way, a still more compact design of the drive unit according to the invention, and thus further savings in weight, can be achieved.

In a further advantageous embodiment of the invention, the second electrode is designed as a mount comprising a metallic material, which mount is arranged opposite the fuel converter. This obviates the need to provide electrical insulation on the fuel converter, so that reliability is increased while production costs are reduced.

In a likewise advantageous embodiment of the intention a fuel regulating unit is provided that reduces the fuel flow to the fuel cell device and at the same time increases the supply of fuel to the combustion chamber for post-combustion. In this manner, as required, the provision of electrical energy can be reduced if such energy is not required or if the aircraft temporarily requires increased thrust, e.g. in the takeoff phase of the aircraft.

To further optimize the fuel consumption, in an advantageous embodiment of the invention the drive unit comprises a motor/generator unit that is electrically connected to the fuel cell device. In this manner, by means of the motor/generator unit, surplus mechanical power can be converted to electrical power, and surplus electrical power can be utilized to support rotary devices of the drive unit, for example of a compressor unit or of a turbine unit.

For this reason, in a particularly advantageous embodiment of the invention, the motor/generator unit comprises at least one shaft between a turbine unit and a compressor unit of the drive unit according to an embodiment of the invention.

Another aspect of the invention includes a vehicle comprising at least one drive unit according to an embodiment of the invention.

Yet another aspect of the invention includes a method for operating a drive unit. The method according to an aspect of the invention particularly preferably comprises the steps of: providing air; carrying out a fuel cell process with air and a fuel in a fuel cell device; feeding exhaust gas from the fuel cell device to a combustion chamber inlet of a combustion chamber; and combusting the fuel-containing exhaust gas within the combustion chamber. In the case of a liquid fuel, the method according to an aspect of the invention can also comprise converting fuel from a liquid to a gaseous phase, wherein this can be implemented by way of vaporization or catalytic conversion.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
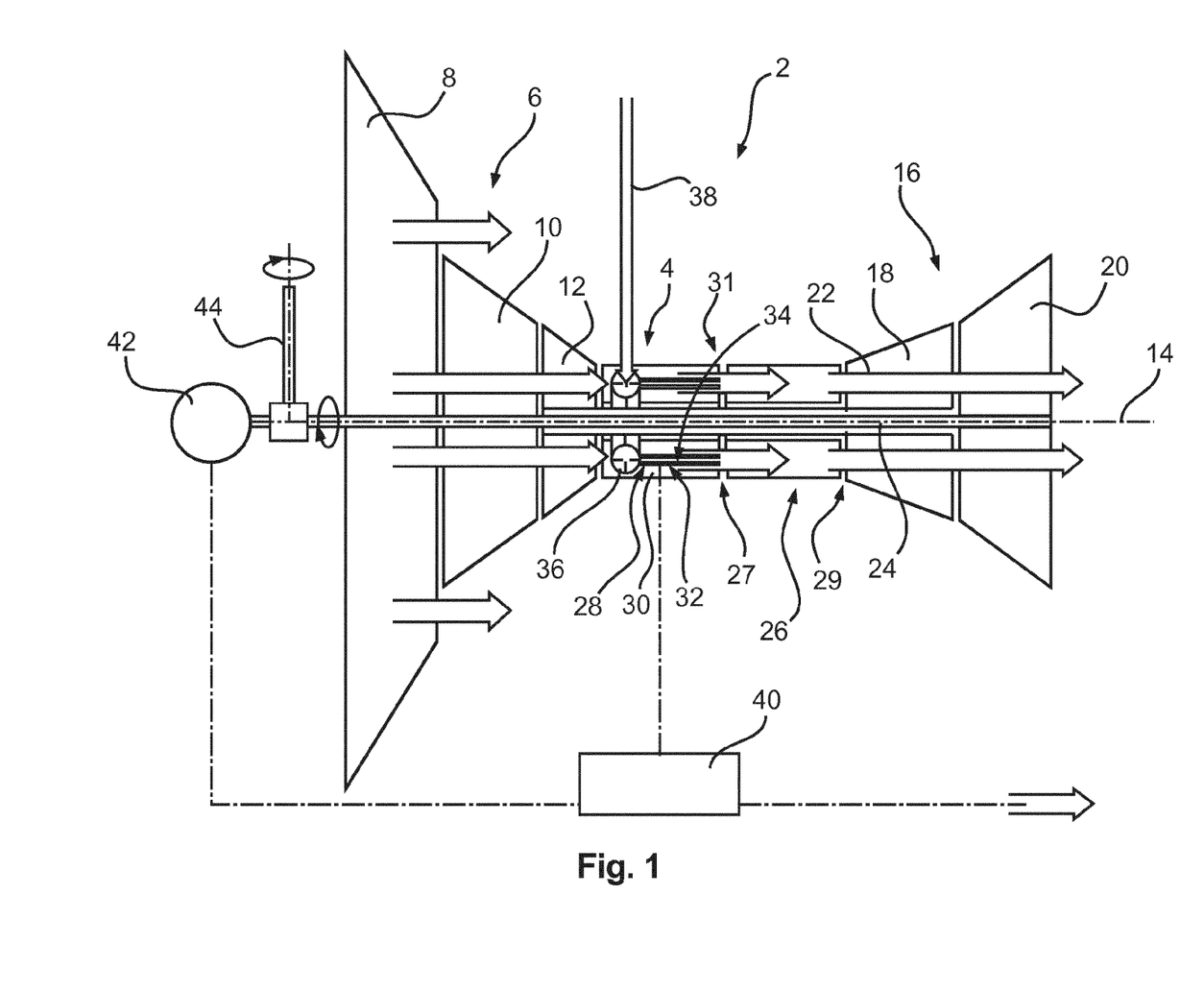
FIG. 1 shows a diagrammatic lateral view of a drive unit according to an embodiment of the invention.

FIG. 1 shows a drive unit 2 according to an embodiment of the invention, which drive unit 2 is, for example, designed primarily as a thrust-generating gas turbine engine and is expanded by an integrated fuel cell device 4 for generating electrical power.

In order to provide the function of a thrust-generating gas turbine engine, the drive unit 2 according to an embodiment of the invention comprises a compressor unit 6 with a bypass fan 8, a first compressor wheel 10 and a second compressor wheel 12, which are concentrically aligned in series along a center axis 14 and which carry out two-stage compression of air flowing into the compressor unit 6 and provide a bypass. Of course, the use of a bypass fan 8 is merely an option, which with the use of a unit 2 according to an embodiment of the invention in a vehicle or in a stationary device is not required if primarily rotational mechanical power is to be provided.

Relative to the direction of flow, indicated by an arrow, on the downstream end of the drive unit 2 according to an embodiment of the invention a turbine unit 16 is arranged which comprises a first turbine wheel 18, and a second turbine wheel 20 arranged downstream. In the illustration shown, the part of the drive unit 2 according to an embodiment of the invention, which part forms the gas turbine engine, is designed as a two-shaft engine in which the first turbine wheel 18 is connected to the second compressor wheel 12 by way of a hollow shaft 22, and the second turbine wheel 20 is connected to the first compressor wheel 10 by way of a shaft 24 that extends within the hollow shaft 22. In this manner the operating characteristics of larger compressor wheels and turbine wheels can be attuned to each other whose rotary speeds are also dependent on the respective diameters. However, the two-shaft design should only be considered as an exemplary embodiment, which is not in any way intended to limit the subject of the invention. The key aspects described below are applicable both in the case of single-shaft engines and in three-shaft engines etc.

In the direction of flow, a combustion chamber 26 with a combustion chamber inlet 27 and a combustion chamber outlet 29 is arranged upstream of the first turbine wheel 18, which combustion chamber 26 is designed to combust a fuel/air mixture. Consequently, within the combustion chamber 26 an increase in pressure takes place which, after the mixture leaves the combustion chamber outlet 29, is converted, by way of the turbine unit 16, to rotary mechanical power.

In the direction of flow, a fuel cell device 4 is arranged upstream of the combustion chamber 26, which fuel cell device 4 is, for example, designed in a ring-shaped manner and is concentrically arranged on the center axis 14, the hollow shaft 22 and the shaft 24. The fuel cell device 4 comprises a number of tubular fuel cells 30 that are arranged together in a ring-shaped manner and comprise a diameter that remains constant over the entire length. Such fuel cells 30 can also comprise a variable diameter which, for example, decreases in the direction of flow, wherein an upstream-facing end of the fuel cells 30 can comprises a step or some other discontinuity that allows simple support of the fuel cells 30 in a supporting device 28.

The tubular fuel cells 30 comprise an anode 32, which in the diagram shown is designed as the inner surface of the respective fuel cell 30, while a cathode 34 is formed by the respective outer surface. The anode 32 is normally supplied with a gaseous anode fuel which is provided by means of a fuel converter 36 arranged upstream, which fuel converter 36, for example, is designed as a ring-shaped fuel vaporizer and is supplied with fuel by way of a fuel line 38. Because of the position of the fuel converter 36 compressed air from the second compressor stage 12 comes into direct contact with the fuel converter 36, so that in that location a fuel that is present in a liquid form vaporizes and is fed in a gaseous form to the tubular fuel cells 30.

In an alternative and likewise advantageous variant that depends on the available fuel, the fuel converter 36 is designed, by means of the transferred heat of the airstream from the second compressor stage 12, to carry out catalytic conversion of the fuel so that a hydrocarbon-based fuel is broken up, and consequently a hydrogen-enriched fuel gas is supplied to the tubular fuel cells 30.

In the shown ring-shaped distribution of fuel cells 30 the fuel converter 36 is particularly preferably also of a ring-shaped design and comprises fuel through-openings (not shown) that correspond to the center axes, situated in the respective longitudinal extension, of the tubular fuel cells 30. In this manner targeted channeling of a fuel gas to the internal surfaces of the tubular fuel cells 30 can be achieved, which can improve the efficiency of the drive unit 2.

With the use of the drive unit 2 according to an embodiment of the invention in a vehicle, based on the mechanical power to be achieved, it can be assumed that a high air volume flow is present that emanates from the second compressor stage 12 and clearly exceeds the requirement for air of a normally-used spatially-separate fuel cell system. In particular in the conception of the drive unit 2 according to an embodiment of the invention as a bypass engine it can be assumed that no special measures need to be taken in order to be able to provide an adequate volume of air for operating the tubular fuel cells 30. However, it must be ensured that the air volume flow that flows through the tubular fuel cells 30 from a fluid outlet 31 of the fuel cell device 4 and the associated fuel mass flow are sufficient to ensure normal operation of the gas turbine arrangement of the drive unit 2. The exhaust gases emanating from the fluid outlet 31 of the fuel cell device 4 consequently comprise on the one hand quite a high temperature, which results on the one hand from the compression that has occurred in the compressor unit 6 as well as from the fuel cell process carried out, and on the other hand quite a high remaining oxygen concentration and adequate fuel for feeding into the combustion chamber inlet 27 and subsequent combustion in the combustion chamber 26.

The drive unit 2 according to an embodiment of the invention can thus, as is the case in conventional gas turbine engines, provide mechanical power in the form of rotary mechanical power or in the form of pure thrust, wherein in the arrangement according to an embodiment of the invention at the same time electrical energy is generated that is not generated by conversion of rotary mechanical power. The electrical power can be fed to a distributor unit 40 that can feed the electrical power to various consumers.

The electrical power that has been generated can not only be fed to an electrical network, but also, for example, to a supplemented motor/generator unit 42 which merely as an example could be mechanically connected to the coupling shaft between the second turbine wheel 20 and the first compressor wheel 8. Using the generated electrical power, the motor/generator unit 42 could thus support the drive of the bypass fan 8 or of the first compressor wheel 10 so that a lower mechanical power requirement is required from the second turbine wheel 20. This results in a lower overall energy uptake by fuel. Conversely, the second turbine wheel 20 could also drive the motor/generator unit 42 so that the latter functions as an emergency power generator in case the fuel cell device 4 were to fail, which significantly increases the redundancy of generating and providing electrical energy. In this way the drive unit 2 can carry out hybrid operation that has high efficiency.

As an alternative or in addition to this the motor/generator unit 42 could also operate an auxiliary drive 44 that could be connected to rotary devices (not shown). For example, the drive unit 2 according to an embodiment of the present invention could be used in a helicopter, wherein the auxiliary drive 44 operates a tail rotor, while the drive unit 2 is primarily used for providing mechanical power for a main rotor.

Figure 2A:
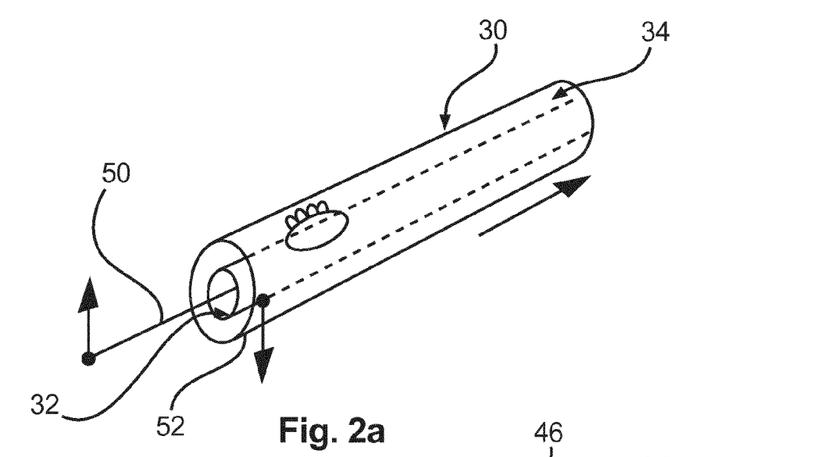
FIGS. 2*a* to 2*c* show three-dimensional views of fuel cells.
Figure 2B:
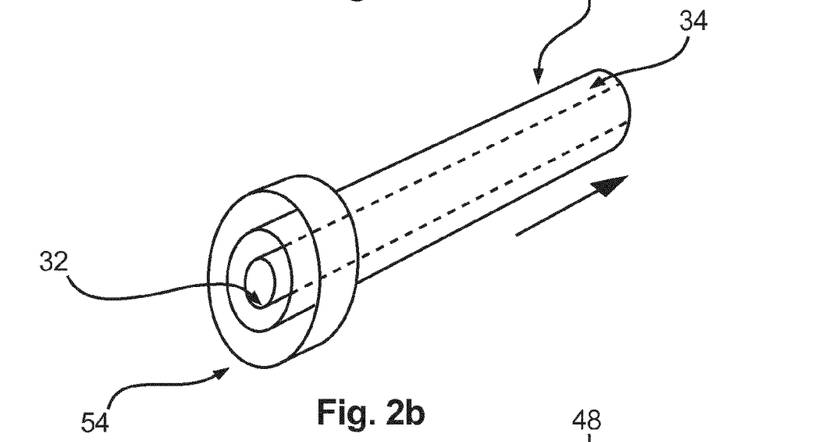
Figure 2C:
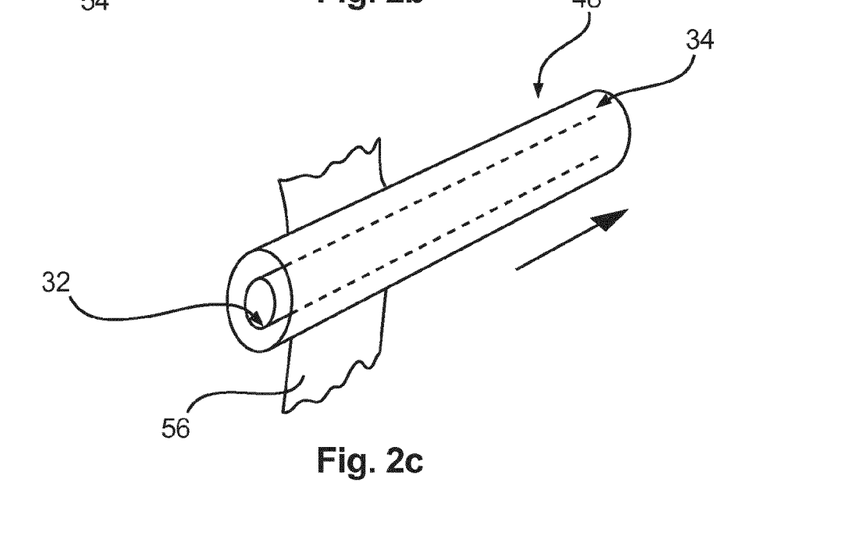

FIGS. 2a, 2b and 2c show differently shaped tubular fuel cells 30, 46 and 48, wherein the respective direction of flow is indicated by an arrow. To tap the electrical power, as an example, FIG. 2a shows an anode connection 50 which is connected to the inner surface of the tubular fuel cell 30 as an anode 32 while a cathode connection 52 is connected to the outer surface of the fuel cell 30 as a cathode 34. The tubular fuel cell 30 of FIG. 2a comprises a pure tubular shape with a round cross section. In contrast to this, FIG. 2b shows a tubular fuel cell 46 with a step 54 that makes it possible to insert the fuel cell 46 in a mounting (not shown) and, for example by means of the fuel converter 36, protect it against sliding out opposite the direction of flow, while the step 54 prevents sliding of the fuel cell 46 along the direction of flow. FIG. 2c shows a tubular fuel cell 48 that conically tapers in the direction of flow and that as a result of the through-flow could be firmly pressed against a seat, wherein this seat could, for example, comprise a cathode connection 56.

Figure 3:
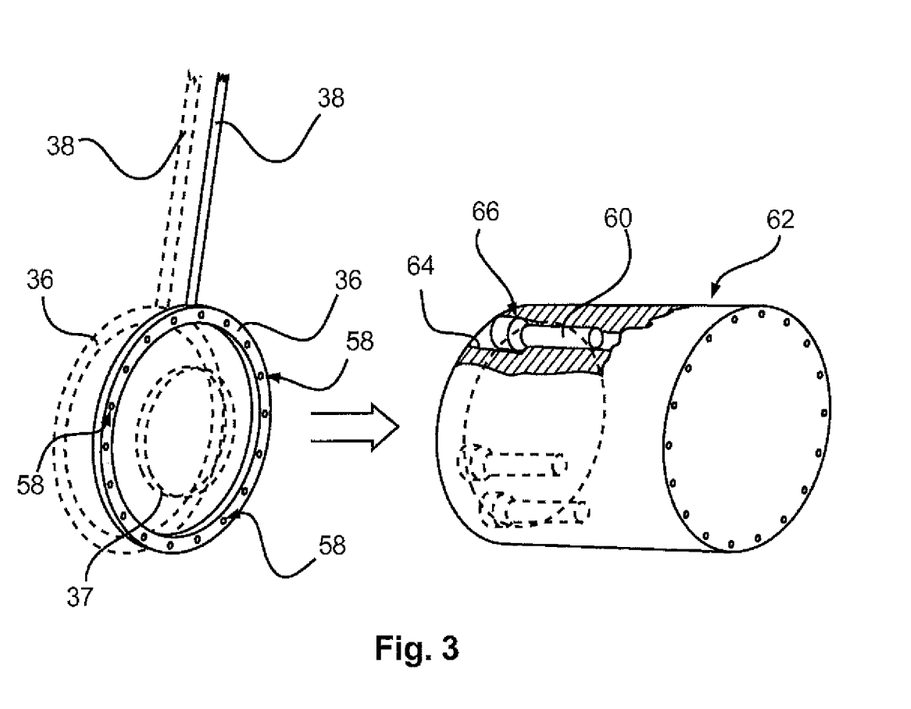
FIG. 3 shows a three-dimensional view of an embodiment of a fuel converter.

As an example, FIG. 3 shows a ring-shaped fuel converter 36 that is connected to a fuel line 38 and at its circumference comprises a number of through-openings 58 that make it possible for a gaseous fuel to flow through them and into following-on tubular fuel cells. As a result of the ring-shaped design of the fuel converter 36 at the same time a holding-down function for tubular fuel cells 60 can be achieved, which tubular fuel cells 60 are, for example, arranged in a fuel cell device 62 in inserts 64, and are protected against sliding through by means of a collar 66, and are held by the fuel converter in the inserts 64. The dashed lines indicate an optional, additional, fuel converter 36 of identical size, wherein both fuel converters 36 can be arranged one behind the other. If several concentric ring-shaped arrangements of fuel cells 60 are used, an additional fuel converter 37 in a concentric arrangement would be imaginable, which fuel converter 37 comprises a smaller diameter than that of the fuel converter 36.

Figure 4:
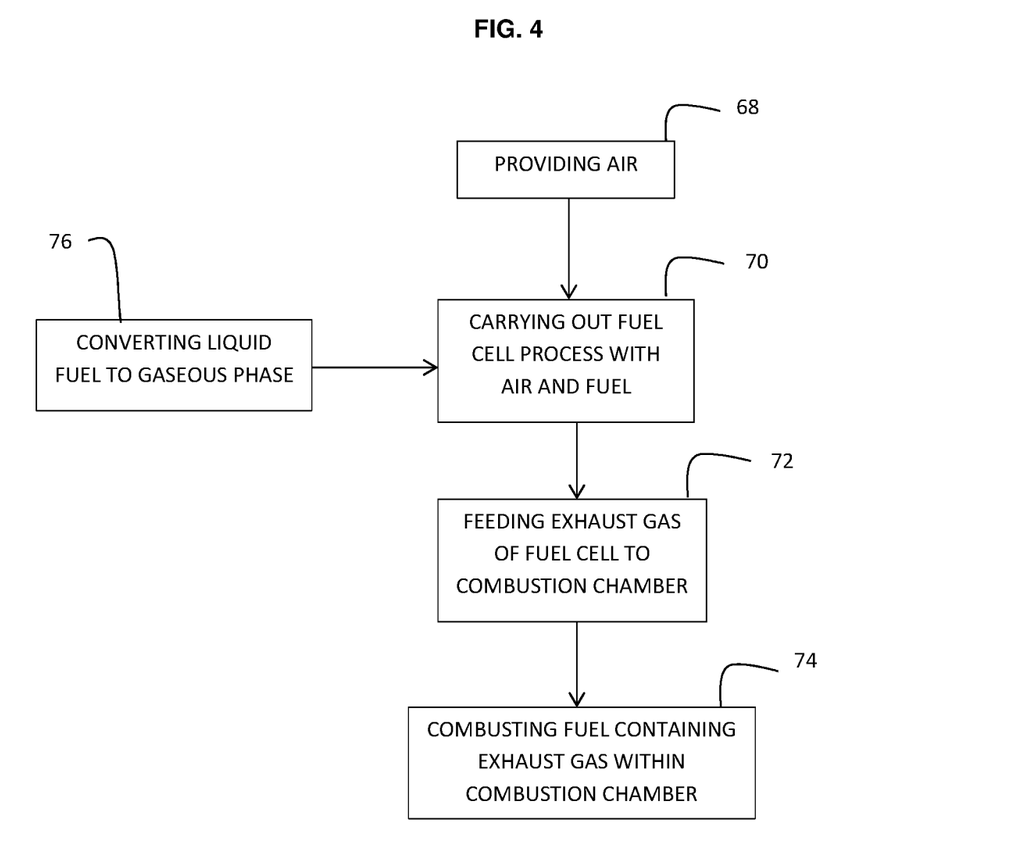
FIG. 4 shows a block diagram of a method according to the invention.

FIG. 4 shows a block diagram of a method according to an aspect of the invention. The essence of the method involves: providing 68 air, carrying out 70 a fuel cell process with the provided air and a fuel in a fuel cell device; feeding 72 exhaust gas of the fuel cell device to a combustion chamber inlet of a combustion chamber; and combusting 74 the fuel-containing exhaust gas within the combustion chamber. In the case of a liquid fuel being used to operate the drive unit, the method according to an aspect of the invention can also comprise converting 76 fuel from a liquid to a gaseous phase, wherein this can be implemented by way of vaporization or catalytic conversion.

While in FIG. 4 the method is shown as a sequence of discrete method-related steps, it is not mandatory for these steps to be carried out step-by-step one after the other, but preferably in a continuous flowing process, wherein in each case subsequent process steps are influenced by the events of the preceding process steps. In this sense the blocks showing the method-related steps can also be considered to show process characteristics of a continuous power provision process.

Figure 5:
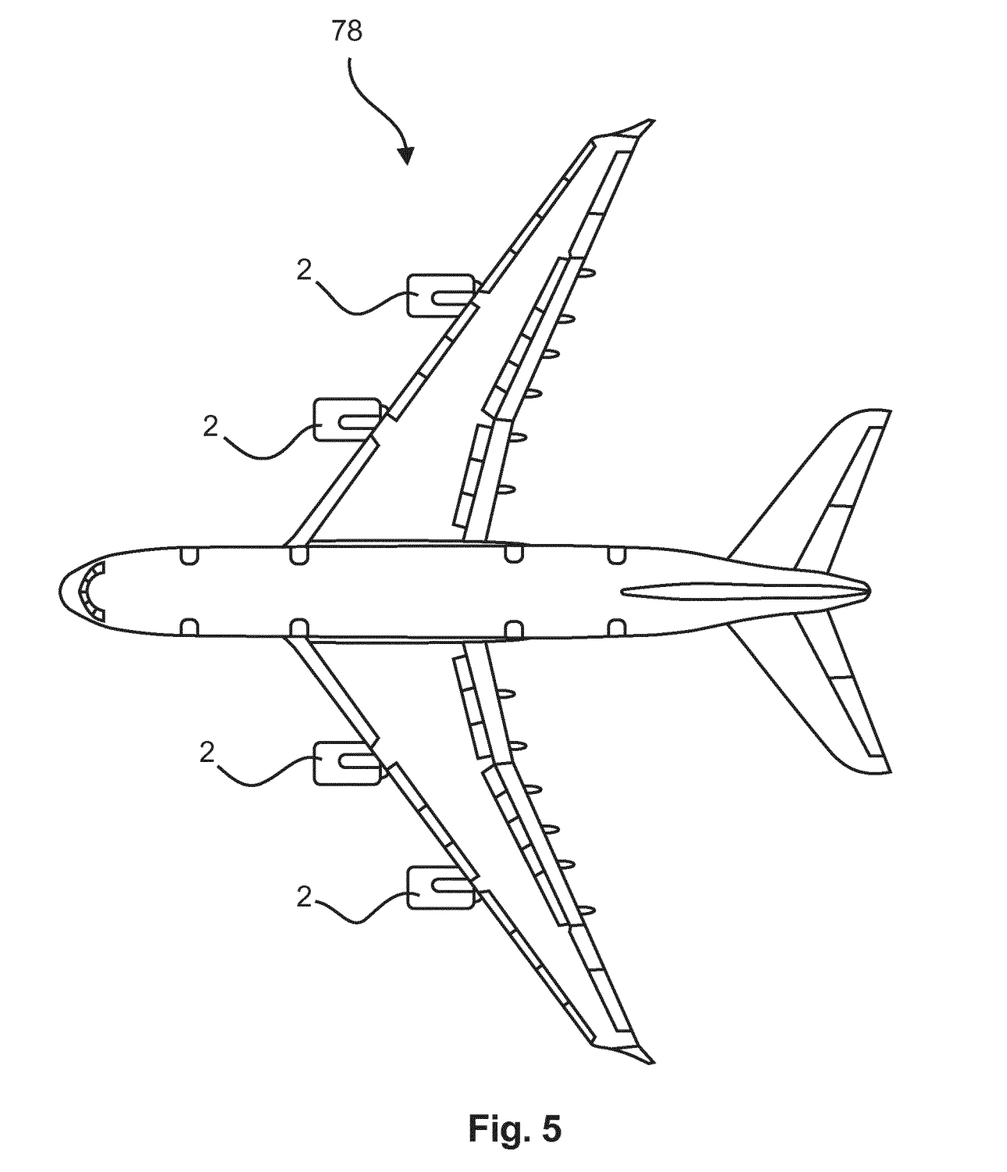
FIG. 5 shows an aircraft comprising several drive units.

Lastly, FIG. 5 shows an aircraft 78 that comprises several drive units 2 according to the invention, and that in a particularly efficient manner can provide both thrust and electrical power.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

2 Drive unit
4 Fuel cell device
6 Compressor unit
8 Bypass fan
10 First compressor wheel
12 Second compressor wheel
14 Center axis
16 Turbine unit
18 First turbine wheel
20 Second turbine wheel
22 Hollow shaft
24 Shaft
26 Combustion chamber
27 Combustion chamber inlet
28 Supporting device
29 Combustion chamber outlet
30 Tubular fuel cell
31 Fluid outlet
32 Anode
34 Cathode
36 Fuel converter
37 Fuel converter
38 Fuel line
40 Distributor unit
42 Motor/generator unit
44 Auxiliary drive
46 Tubular fuel cell
48 Tubular fuel cell
50 Anode connection
52 Cathode connection
54 Step/collar
56 Cathode connection
58 Through-opening
60 Tubular fuel cell
62 Fuel cell device
64 Insert
66 Collar
68 Providing air
70 Carrying out a fuel cell process
72 Feeding exhaust gas
74 Combusting
76 Converting fuel
78 Aircraft

The invention claimed is:
1. A drive unit, comprising:
a combustion chamber for combusting a fuel/air mixture;
a ring-shaped fuel cell device
comprising at least one fuel cell comprising:
an anode couplable to a fuel line;
a cathode couplable to an air source; and
a fluid outlet, wherein the fuel cell is arranged upstream of the combustion chamber; and
at least one ring-shaped fuel converter arranged between the fuel line and the fuel cell device, the fuel converter adapted to provide a gaseous fuel from a liquid fuel,
wherein the combustion chamber comprises;
a combustion chamber inlet for supplying the fuel/air mixture; and
a combustion chamber outlet for discharging exhaust gas, and the combustion chamber inlet is connected to the fluid outlet of the fuel cell device, and
wherein the ring-shaped fuel cell device and the ring-shaped fuel converter are concentric.
2. The drive unit according to claim 1, further comprising:
a compressor unit arranged upstream of the fuel cell device, and
a turbine unit arranged downstream of the combustion chamber, wherein the compressor unit comprises at least one compressor wheel, and the turbine unit comprises at least one turbine wheel, and the at least one compressor wheel and the at least one turbine wheel are interconnected by way of at least one shaft.

3. The drive unit according to claim 1, wherein the at least one fuel cell of the fuel cell device is configured as a tubular fuel cell that is open on two sides.

4. The drive unit according to claim 3, wherein the at least one tubular fuel cell comprises an anode formed by an inner surface, and a cathode formed by an outer surface.

5. The drive unit according to claim 2, wherein the fuel cell device comprises a plurality of tubular fuel cells concentrically arranged rings and/or on rings arranged one behind the other are distributed relative to the at least one shaft.

6. The drive unit according to claim 2, wherein the fuel cell device comprises a plurality of tubular fuel cells distributed in a ring-shaped manner around the at least one shaft.

7. The drive unit of claim 6, wherein the ring-shaped fuel converter comprises a plurality of through-openings about a circumference of the fuel converter such that each of the plurality of tubular fuel cells communicate with one of the plurality of through-openings for receiving a gaseous fuel therethrough.

8. The drive unit according to claim 1, wherein the fuel converter comprises a metallic material, and is in surface contact with the cathodes of the fuel cells for establishing an electrical connection.

9. The drive unit according to claim 1, further comprising a motor/generator unit electrically connected to the fuel cell device.

10. The drive unit according to claim 2, further comprising a motor/generator unit electrically connected to the fuel cell device; and
wherein the motor/generator unit is mechanically connected to at least one shaft to support operation of the compressor unit.

11. A method for operating a drive unit, comprising the steps of: providing air;
converting a liquid fuel into a gaseous fuel in a ring-shaped fuel converter;
carrying out a fuel cell process with the provided air and the gaseous fuel in a ring-shaped fuel cell device;
feeding exhaust gas from the fuel cell device to a combustion chamber inlet of a combustion chamber; and
combusting the fuel-containing exhaust gas within the combustion chamber, wherein the ring-shaped fuel cell device and the ring-shaped fuel converter are concentric.

12. The method according to claim 11, further comprising converting fuel from a liquid to a gaseous phase.

13. The method according to claim 12, wherein the converting is implemented as a catalytic conversion.

14. An aircraft comprising at least one drive unit comprising:
a combustion chamber for combusting a fuel/air mixture;
a fuel cell device
comprising at least one fuel cell comprising an anode couplable to a fuel line, a cathode couplable to an air source, and a fluid outlet, wherein the fuel cell is arranged upstream of the combustion chamber, and
at least one ring-shaped fuel converter arranged between the fuel line and the fuel cell device, which fuel converter is adapted to provide a gaseous fuel from a liquid fuel,
at least one compressor unit arranged upstream of the fuel cell device;
at least one turbine unit arranged downstream of the combustion chamber; and
at least one shaft interconnecting the at least one compressor unit and the at least one compressor unit,
wherein the combustion chamber comprises a combustion chamber inlet for supplying the fuel/air mixture, and a combustion chamber outlet for discharging exhaust gas, and the combustion chamber inlet is connected to the fluid outlet of the fuel cell device, and
wherein the at least one ring-shaped fuel converter is arranged coaxially about the at least one shaft.

* * * * *